Nov. 26, 1968                M. M. ATALLA                3,413,497
            INSULATED-GATE FIELD EFFECT TRANSISTOR WITH
                   ELECTROSTATIC PROTECTION MEANS
                       Filed July 13, 1966

INVENTOR
MARTIN M. ATALLA
BY   A. C. Smith
ATTORNEY

United States Patent Office 3,413,497
Patented Nov. 26, 1968

3,413,497
INSULATED-GATE FIELD EFFECT TRANSISTOR WITH ELECTROSTATIC PROTECTION MEANS
Martin M. Atalla, Portola Valley, Calif., assignor to Hewlett-Packard Company, Palo Alto, Calif., a corporation of California
Filed July 13, 1966, Ser. No. 564,925
1 Claim. (Cl. 307—304)

This invention relates to an electrostatically actuated device and has as its object the provision of a cantilevered member which can be operated as a switch as well as a mechanical deflection element in force or frequency responsive systems.

Figure 1:
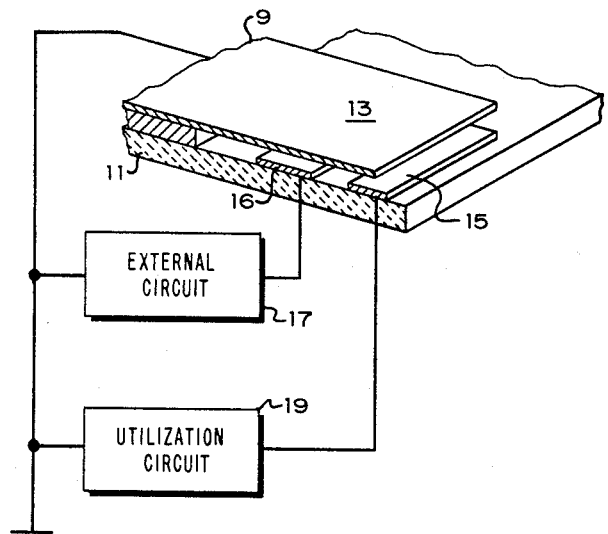
Figure 2:
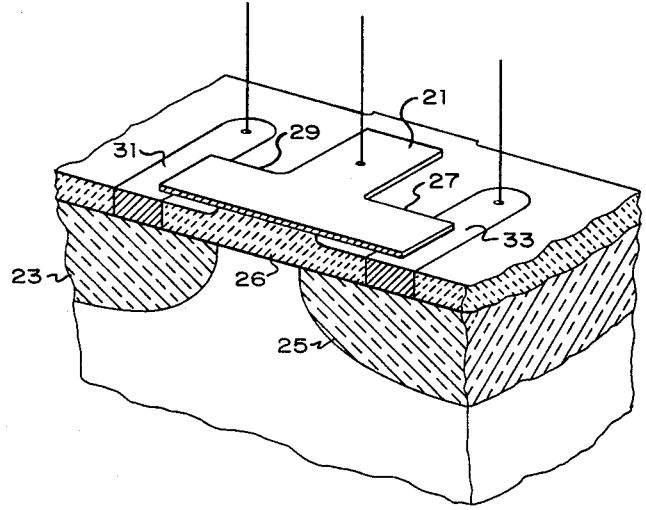

In the drawing, FIGURE 1 is a diagram of a typical circuit connection of the device of the present invention and FIGURE 2 is a sectional view of the device arranged to operate as an over-voltage protector for an insulated gate field-effect transistor. The device includes a deflectable member 9 which is mounted at one end in a cantilever fashion on a base 11 with the unsupported end 13 disposed over at least one electrode 15. A control electrode 16 is disposed on the base 11 beneath the member 9 at a location intermediate the electrode 15 and the mounted end of member 9. A difference of potential developed between the member 9 and the electrode 16 by an external circuit 17 produces an electrostatic attraction between the member 9 and electrode 16 which results in the downward deflection of member 9 into contact with electrode 15. Utilization circuit 19 connected between electrode 15 and member 9 is thus under the control of external circuit 17 when the device of the present invention is operated as a relay.

Member 9 may also operate as a force transducer, for example, in a true RMS measuring instrument. There, a signal may be applied to electrode 16 by external circuit 17 to deflect the member 9 as a result of the electrostatic force exerted thereon related to the RMS value of an applied alternating signal. This force may be overcome by applying an opposing unidirectional difference of potential between electrode 15 and the member 9 such that the force on the member 9 is exactly opposed and the member 9 remains in undeflected position as detected, for example, by light reflection from its upper surface. Also, the member 9, which has a predetermined mass and compliance, may be operated as a resonator when actuated electrostatically by the circuits 17, 19 to operate at its natural frequency. Of course, numerous other applications of the present invention are possible using one or more electrodes disposed beneath the member 9 for controlling its deflection and for making contact with the deflected beam.

In FIGURE 2, the gate electrode 21 is insulated from the top surfaces of source and drain electrodes 23, 25 by an insulating layer 26 to form a conventional insulated gate field effect transistor. The gate electrode 21 is formed to include deflectable members 27, 29 disposed to contact the low ohmic connections 31, 33 on the source and drain electrodes 23, 25 in response to the downward deflection of the members 27, 29. In practice, these members may have a thickness of a few thousandths of an inch with the deflectable ends elevated above the connections 31, 33 by only a few ten thousandths of an inch so that a few tens of volts between the gate electrode 21 and a connection 31, 33 deflects a member 27, 29 into contact with the corresponding connection 31, 33. This protects the insulating layer 26 from rupture or breakdown on overvoltage applied to the gate electrode 21 by an external circuit.

I claim:
1. In combination, an insulated gate field-effect transistor and protection means therefore comprising: a body of semi-conductor material, spaced source and drain regions within said body at one major surface thereof, source and drain electrodes on said surface connected to said regions respectively, an insulating layer on said surface between said source and drain electrodes, a gate electrode on said insulating layer, said gate electrode extending outwardly from an edge of said insulating layer parallel to said surface and being cantilevered directly over one of said source and drain electrodes but normally spaced therefrom, and bias means connected between said gate electrode and said one of said source and drain electrodes for electrostatically deflecting said gate electrode into contact with said one of said source and drain electrodes for electrically connecting said gate electrode and said one of said source and drain electrodes to protect said insulating layer from rupture.

References Cited

UNITED STATES PATENTS

| 2,033,631 | 3/1936 | Gruetzmacher | 200—181 |
|---|---|---|---|
| 2,927,255 | 3/1960 | Diesel | 200—181 X |
| 3,178,804 | 4/1965 | Ullery | 29—155.5 |
| 3,287,506 | 11/1966 | Hahnlein | 179—110 |
| 3,295,023 | 12/1966 | Peras | 200—181 X |
| 3,356,858 | 12/1967 | Wanlass | 307—88.5 |

JOHN W. HUCKERT, *Primary Examiner.*

J. R. SHEWMAKER, *Assistant Examiner.*